United States Patent
Berg et al.

(10) Patent No.: US 7,234,040 B2
(45) Date of Patent: Jun. 19, 2007

(54) PROGRAM-DIRECTED CACHE PREFETCHING FOR MEDIA PROCESSORS

(75) Inventors: Stefan G. Berg, Tulsa, OK (US); Donglok Kim, Issaquah, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 400 days.

(21) Appl. No.: 10/895,232

(22) Filed: Jul. 20, 2004

(65) Prior Publication Data

US 2004/0268051 A1 Dec. 30, 2004

Related U.S. Application Data

(63) Continuation-in-part of application No. 10/056,247, filed on Jan. 24, 2002, now abandoned.

(51) Int. Cl.
*G06F 9/26* (2006.01)
(52) U.S. Cl. .................................. 711/213; 711/137
(58) Field of Classification Search ............... None
See application file for complete search history.

(56) References Cited

U.S. PATENT DOCUMENTS

| | | | | |
|---|---|---|---|---|
| 5,774,685 | A | 6/1998 | Dubey | 712/205 |
| 6,055,621 | A | 4/2000 | Puzak | 712/207 |
| 6,195,735 | B1* | 2/2001 | Krueger et al. | 711/204 |
| 6,421,826 | B1* | 7/2002 | Kosche et al. | 717/161 |
| 6,963,954 | B1* | 11/2005 | Trehus et al. | 711/137 |

OTHER PUBLICATIONS

Chen, Tien-Fu and Jean-Loup Baer. May 1995. Effective Hardware-Based Data Prefetching for High-Performance Processors. *IEEE Transactions on Computers* 44:5 609-623.

Mowry, Todd C., Monica S. Lam and Anoop Gupta. Oct. 1992. Design and Evaluation of a Compiler Algorithm for Prefetching. *ASPLOS* Oct. 1992: 62-73.

Jouppi, Norman P. 1990. Improving Direct-Mapped Cache Performance by the Addition of a Small Fully-Associative Cache and Prefetch Buffers. *IEEE* Aug. 1990 388-396.

* cited by examiner

*Primary Examiner*—T Nguyen
(74) *Attorney, Agent, or Firm*—Ronald M. Anderson

(57) ABSTRACT

Data are prefetched into a cache from a prefetch region of memory, based on a program instruction reference and on compile-time information that indicates the bounds of the prefetch region, a size of a prefetch block, and a location of the prefetch block. If the program reference address lies with the prefetch region, an offset distance is used to determine the address of the prefetch block. Prefetching is performed either from a continuous one-dimensional prefetch region, or an embedded multi-dimensional prefetch region. The prefetch block address is respectively determined in one dimension or multiple dimensions. Program-directed prefetching is implemented by a media processor or by a separate processing component in communication with the media processor. The primary components include a program-directed prefetch controller, a cache, a function unit, and a memory. Preferably, region registers store the compile-time information, and the prefetched data are stored in a cache prefetch buffer.

31 Claims, 6 Drawing Sheets

PROGRAM-DIRECTED CACHE PREFETCHING FOR MEDIA PROCESSORS

RELATED APPLICATION

This is a continuation-in-part of prior U.S. patent application Ser. No. 10/056,247 filed Jan. 24, 2002 now abandoned, the benefit of the filing date of which is claimed under 35 U.S.C. § 120.

FIELD OF THE INVENTION

The present invention is generally directed to a method and system for prefetching consecutive data from memory, and more specifically, to prefetching consecutive data in response to hints included in programmed instructions.

BACKGROUND OF THE INVENTION

Accessing computer memory for image and video processing functions imposes different requirements than accessing computer memory for carrying out general-purpose computing functions. In particular, many image/video processing functions are characterized by high spatial locality, meaning that the functions require access to pieces of data that are stored in close proximity to each other within memory. Typically, image data are stored in consecutive blocks of memory, and image functions, such as frame averaging and two-dimensional transposition, generally require sequential access to the consecutive blocks of data. However, image/video processing functions characteristically have little temporal locality, meaning that these functions typically don't need to reuse the same pieces of data after a short period of time. For example, functions such as frame averaging and two-dimensional transposition generally do not reuse the same blocks of data after a short period of time.

Cache memories are well suited to temporarily store data for repeated access by a processor. Thus, cache memories are best employed when functions are executed that have sufficient temporal locality, so that the data stored in the cache can be reused often. However, caches are not well suited for functions having primarily spatial locality. The ability of caches to exploit spatial locality is limited due to the relatively small size of cache lines, where a cache line is the smallest unit of memory that can be transferred between main memory and the cache. (Cache lines are also sometimes referred to as cache blocks.)

Many media processors try to overcome the limitations of caches by replacing or supplementing them with direct memory access (DMA) controllers. Double buffering has become a popular programming technique when utilizing DMA controllers and takes advantage of the static and simple memory references in most image/video computing functions. With double buffering, the DMA controller transfers data to an on-chip buffer while the processor uses data stored in another on-chip buffer as its input. The roles of the two buffers are switched when the DMA controller and the processor are finished with their respective buffers.

Double buffering overlaps computation and memory transfers. This overlap hides memory latency very effectively. In addition, the memory bandwidth obtained is typically higher with DMA transfers than those obtained when fetching data from cache lines. There are two reasons for this. First, most modern main memory designs enable the address and data phases to be decoupled, so that addressing and data access periods can be overlapped. An example of this type of memory is RAMBUS™ dynamic random access memory (RDRAM). These main memories typically operate most efficiently when the supply of read addresses is uninterrupted and pipelined, which is possible with DMA data transfers. A continuous supply of addresses is more difficult to guarantee when using a cache, because a cache miss only results in a few words of data being loaded from main memory. In fact, a continuous supply of addresses is impossible unless the cache is non-blocking, meaning that the processor is not blocked (stalled) from continuing to execute subsequent instructions during a cache miss. Of course, the processor is allowed to execute subsequent instructions only if the subsequent instructions do not use the data being loaded by a cache miss service. In double buffering, a block of data is typically large enough that the DMA controller will typically fetch a longer portion of a dynamic random access memory (DRAM) page than would be fetched during a cache miss. Since DRAMs are most efficient when accessing data within a page, double buffering also improves the data transfer bandwidth.

The use of double buffering enables computation-bound functions to minimize memory stalls, since it effectively hides the memory latency behind continued computing time. For memory-bound functions, efficient bandwidth utilization directly translates into better performance, because execution time is highly correlated with the memory bandwidth obtained.

The disadvantage of using DMA controllers for double buffering is that they make programming significantly more difficult. A DMA controller must be programmed separately from the main data processing. The DMA controller must also be properly synchronized to the program running on functional units. The programmer must keep track of where the data are stored and explicitly perform transfers between on-chip and off-chip memories. Current compiler technologies are unable to simplify most of these tasks. Thus, substantial programming effort expended in developing an image computing function is directed to establishing correct and efficient DMA data transfers.

It would be desirable for a cache to mimic the efficient memory addressing characteristics of functions running on a DMA controller to ensure that memory bandwidth utilization is high, while avoiding the need for difficult and time-consuming DMA programming. It would also be desirable to prefetch blocks of data larger than a cache line sufficiently early to reduce cache miss penalties.

A particular concern with prefetching large blocks of memory is that a misprediction of the data that are needed will result in a large amount of useless data being transferred to the processor, since a prefetch is useful only when the prefetched data are employed by the processor before the data are replaced. High prefetching accuracy is therefore needed to avoid useless prefetches. Achieving a high accuracy in this task by using suitable hardware would require significant on-chip space, and it might take a significant amount of time for the hardware to collect the necessary information, such as memory addresses, from run-time information. Any delay in this decision-making process will incur cache misses early in the execution.

For these reasons, it would be desirable to use compile-time information to aid in prefetching. Preferably, such compile-time information would be determined indirectly from instructions (hints) provided by a programmer or compiler. For example, hints provided by the programmer or compiler could identify the region of data and a general direction in which to prefetch the data. This concept of providing programmed hints is referred to herein as program-directed prefetching (PDP). Although PDP requires the programmer's active role in creating the hints, the programming effort can be significantly reduced since the programmer does not have to deal with the complicated data transfer synchronization problem. Furthermore, since no DMA programming interface, which is architecture dependent, would be required, the portability of functions would be improved by providing a cache prefetcher mechanism such as PDP.

SUMMARY OF THE INVENTION

The present invention is directed to a method for prefetching data from a prefetch region of memory, based on a hint included in program instructions and other compile-time information that indicates the bounds of the prefetch region, a size of a prefetch block of data, and a location of the prefetch block of data. Rather than requiring a programmer or DMA controller to identify and control prefetch blocks of data, a reference address of a program instruction provides an indirect hint as to where to prefetch the data. The program instruction is preferably directed to some aspect of processing data at the reference address within the prefetch region, but not primarily directed to prefetching the prefetch block of data. Instead, the reference address is used with the other compile-time information to determine an address of the prefetch block of data.

To access the prefetch block of data, the reference address and compile-time information are used to determine whether the reference address falls within the prefetch region of memory. The compile-time information is preferably obtained during compilation of all the program instructions and indicates the location of the bounds of the prefetch region, a size of a prefetch block of data, and an offset to a prefetch block from a reference address. However, the compile-time information may alternatively be provided directly by a programmer. If the current reference address falls within the prefetch region, a specific address of the prefetch block is determined, based on the offset from the reference address. The prefetch block of data is then obtained from memory and communicated to a cache, so that the prefetched block of data is available for use by a processor.

The invention may prefetch data from a one-dimensional prefetch region or a multi-dimensional prefetch region, depending on the detail provided by the compile-time information. A one-dimensional prefetch region simply comprises a continuous segment of memory, and is easily defined by a base address and a size. For example, a one-dimensional prefetch region may store data representing an entire image or an upper portion of an image. A two-dimensional prefetch region comprises an embedded segment of memory, the bounds of which may be defined by virtual horizontal and vertical dimensions. For example, a two-dimensional prefetch region may store data representing only a portion of an image, such as a rectangular portion disposed within the image. If only a portion of the image will be processed at a time, it is beneficial to prefetch only data that correspond to the current portion of the image, rather than prefetching a continuous segment that includes excess data outside the desired portion of the image. Additional dimensions may be included to define the bounds of the prefetch region.

Similarly, the specific address of a prefetch block of data may be determined in one dimension or multi dimensions. The specific address of a prefetch block of data in a one-dimensional prefetch region is determined by offsetting the reference address by a prefetch distance corresponding to a number of blocks that are the size of the prefetch block. The specific address of a prefetch block of data in a two-dimensional prefetch region requires more detailed offsetting in horizontal and vertical directions, but is analogous to the one-dimensional case.

The prefetched block of data may be stored in a prefetch buffer or directly in a data area of the cache. Prior to performing a prefetch, the prefetch buffer, data area, or a write buffer may first be checked to determine whether the desired prefetch data is already available to the processor.

Another aspect of the invention is directed to a machine-readable medium storing machine instructions and parameters for performing the method described above.

A further aspect of the invention is directed to a system for program-directed prefetching of data. Such a system may be embodied as a media processor or as an on-chip unit in communication with the media processor. The primary components include a PDP controller, a cache, a function unit, and a memory. Preferably, the PDP controller comprises sets of region registers, each set of which stores compile-time information defining a prefetch region. The PDP controller may control the prefetching process, or simply provide the compile-time information to a cache controller, which performs the prefetches. The cache also preferably includes a prefetch buffer for storing the prefetched data until the data are communicated to a data area of the cache for use by the function unit.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Description of System for Implementing the Present Invention

Figure 1:
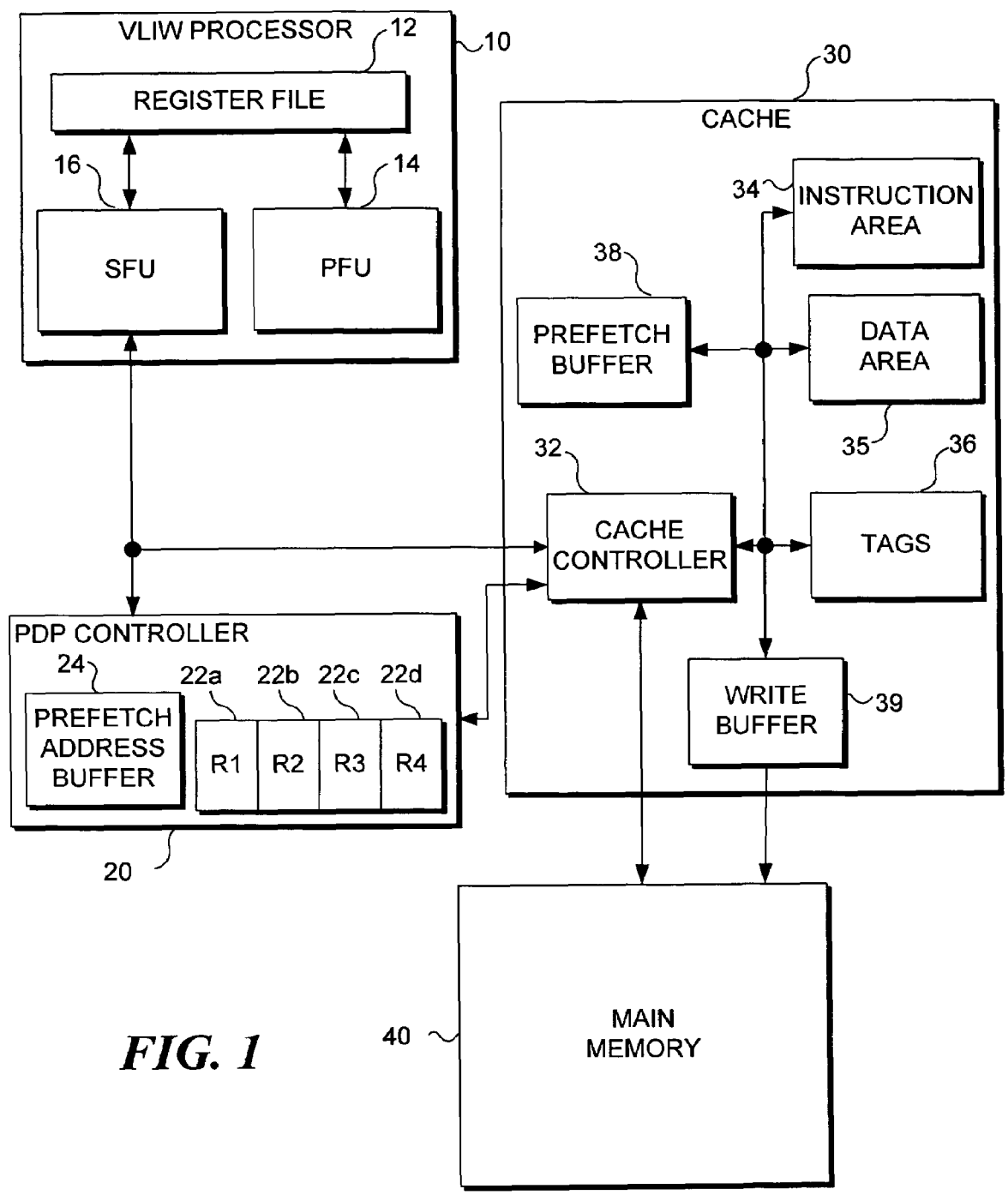
FIG. 1 illustrates a preferred embodiment of the present invention, incorporated into processor hardware.

FIG. 1 illustrates a preferred embodiment of the present invention, incorporated into processor hardware, such as a set-top box for video processing, graphics processing, gaming, or other media processing system. Such systems preferably include a two-issue, very long instruction word (VLIW) processor 10. Processor 10 includes a register file 12, which is in communication with a 256-bit partitioned function unit (PFU) 14 and a 32-bit scalar function unit (SFU) 16. The SFU has 32 32-bit registers and the PFU has 64 256-bit registers. Memory reference and control-flow instructions can only be executed on the SFU.

In communication with SFU 16 is a PDP controller 20 for performing prefetches and/or providing compile-time information for prefetches to be performed by another unit of the architecture. PDP controller 20 includes region register sets 22a through 22d. Those skilled in the art will recognize that more or fewer sets may be included. Each region register set includes a plurality of registers for storing the compile-time information that defines a prefetch region. PDP controller 20 also includes a prefetch address buffer 24 for queuing memory addresses to be prefetched.

PDP controller 20 and SFU 16 are in communication with a cache 30 through a cache controller 32. Cache 30 preferably includes a 32-Kbyte, 4-way set-associative instruction cache area 34 that has a 32-byte cache line size. Cache 30 also preferably includes an 8-Kbyte, 4-way set-associative data cache area 35 that also uses a 32-byte cache line size. Data cache area 35 is preferably a non-blocking cache with a 64-cycle minimum cache miss delay, however a blocking cache was utilized during simulations described below. Data cache area 35 also preferably uses a least recently used (LRU) replacement policy, whereby the LRU lines will be replaced when more space is needed for new data. Further, for data cache area 35, cache 30 preferably uses a write-allocate policy, except for 256-bit register stores, where no data must be loaded. Cache 30 also includes a tag list 36 for identifying data within cache 30. Transfers to and from instruction cache area 34, data cache area 35, and tag list 36 are managed by cache controller 32.

Also in communication with cache controller 32 is a prefetch buffer 38. Preferably, prefetch buffer 38 has a buffer size of 16 Kbytes and is organized as a LRU read cache. Prefetched data are stored in prefetch buffer 38, then copied (or moved) to individual cache lines of data cache area 35 when the prefetched data are referenced by a load or store instruction directed to primary processing of the previously prefetched data. Sixteen kilobyte (16-Kbyte) prefetch buffer 38 is relatively large compared to 8-Kbyte data cache area 35, because the ability to buffer significant amounts of prefetched data is more important in media processing than the ability to reaccess a large amount of old data quickly. In other words, because media processing applications typically lack temporal locality, a large cache is less important than a large buffer. It is contemplated that prefetch buffer 38 could be incorporated into PDP 20, that PDP 20 could be incorporated into cache 30, but other configurations of these devices can alternatively be employed.

Balancing the on-chip memory requirements between data cache area 35 and prefetch buffer 38 can be difficult. For functions well suited to spatial locality, data cache area 35 may be of little importance. For example, in frame averaging there is no reuse of data. However, in other functions, such as two-dimensional convolution, there is significant data reuse and the data cache is important for reducing the main memory bandwidth requirements. To address this problem for a wide range of functions, an alternative embodiment unifies prefetch buffer 38 and data cache area 35. In this embodiment, prefetch controller 20 stores prefetched data directly in data cache area 35.

Unfortunately, prefetches can evict useful data from the cache if the processor does not access the data before data cache area 35 is filled with prefetched data. Furthermore, pressure on access ports of data cache area 35 may increase, because it is possible that cache accesses and writing of prefetched data could occur simultaneously. To address this problem, another alternative embodiment uses a dual-ported data cache. This embodiment may reduce the space savings obtained from unifying data cache area 35 and prefetch buffer 38, depending on target applications, available chip design, and very large scale integration (VLSI) technologies.

A write buffer 39 that helps to issue writes in bursts to a main memory 40 is in communication with cache controller 32. Write buffer 39 does not begin writing back until after 96 cache lines have been stored (i.e., hi-level=96). At that point, cache controller 32 completely empties write buffer 39 (i.e., lo-level=0). Even though cache misses cannot be serviced while write buffer 39 is being written back, this technique improves overall execution time, because writes that are intermixed with read accesses typically incur a DRAM page miss on each write.

Cache controller 32 is also in communication with main memory 40 that stores data and machine instructions. Main memory 40 is preferably a DRAM, such as a PC800 Direct RAMBUS™ main memory or a synchronous dynamic random access memory (SDRAM) main memory. Main memory 40 preferably has at least a peak transfer rate of 64 bits of data per processor cycle. Peak main memory bandwidth is preferably obtained, for example, by employing at least a 400 MHz processor clock and one or more RAMBUS™ channels or an SDRAM bus. In the simulations below two 16-bit RAMBUS™ channels were used.

Prefetching in One Dimension

Figure 2:
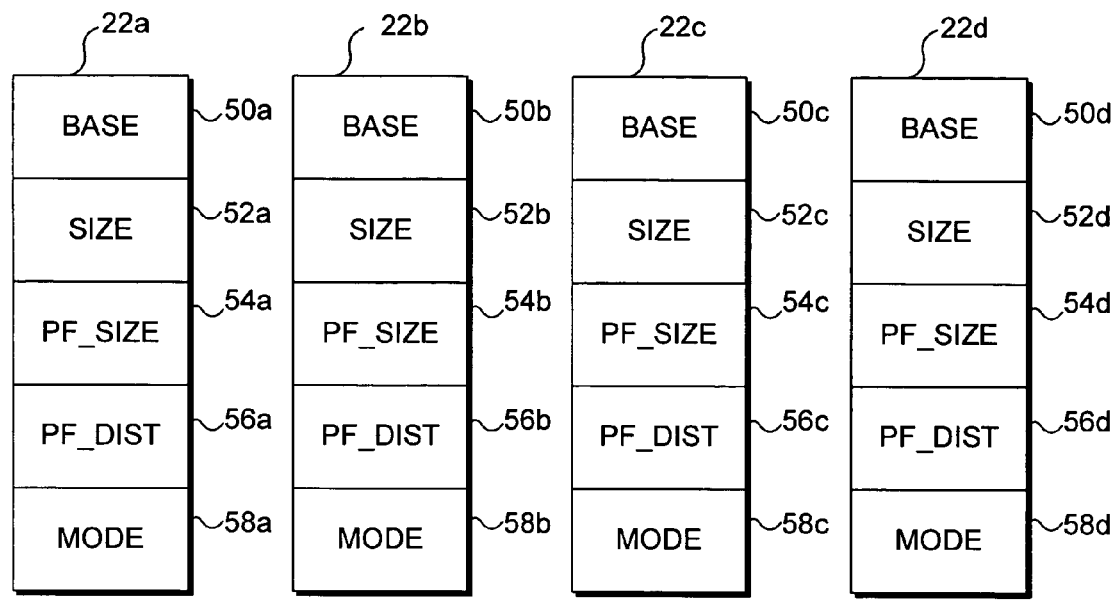
FIG. 2 illustrates a first data structure of compile-time information stored in hardware registers of the PDP controller used for one-dimensional prefetching.

In one preferred embodiment, the compile-time information defines the extent of a prefetch region within the main memory and also defines basic information about how to prefetch data. Preferably, up to four prefetch regions are defined. FIG. 2 illustrates a first data structure of compile-time information stored in hardware registers of the PDP controller used for prefetching. For example, a first set of region registers 22a includes a base address 50a, which is the starting address within main memory of a first prefetch region. A size 52a indicates a number of bytes defining the extent of the first prefetch region within which image, video, or graphics data are stored. For example, size 52a may be 256 Kbytes corresponding to the storage size of a first image. Those skilled in the art will recognize that the prefetch region could alternatively be defined by base address 50a and an end address, or by other information.

A prefetch size (PF_SIZE) 54a defines a block size of prefetch data and depends on the image function being performed. Preferably prefetch size 54a corresponds to a page size of dynamic random access memory (DRAM) and is preferably 4 Kbytes or smaller. Accordingly, prefetches will occur in blocks of data that are the size defined by PF_SIZE 54a.

A prefetch distance (PF_DIST) 56a indicates a number of blocks of PF_SIZE 54a between a reference address and a desired prefetch block. An instruction, such as a load instruction, is executed by the processor primarily to process data from the reference address, which is not the address of data to be currently prefetched. However, if the reference address falls within the prefetch region, it is safe to assume that other data in the prefetch region will soon be needed for processing. Therefore, other data in the prefetch region can be prefetched, so that the other data will be available to the processor when needed. Effectively, the reference address of an instruction, indirectly provides a hint to prefetch subsequent data in the prefetch region, and indicates where to prefetch that subsequent data. Although a reference address can be associated with some special purpose instructions, such as cache invalidation instructions, a reference address is more typically associated with a load or store instruction. Thus, the PDP controller checks each load and store instruction for a reference address within the prefetch region. If a reference address is within the prefetch region, the PDP controller computes a prefetch address based on prefetch distance and prefetch size. Specifically, PF_DIST 56a identifies a number of blocks of size PF_SIZE 54a, beyond the reference address, where the desired prefetch block is located. For example, if PF_DIST 56a is set to five (5), a prefetch will be issued for data at the fifth block following the reference address. The PDP controller instructs the cache to prefetch the desired prefetch block of data at the prefetch address. For efficient memory access, the cache preferably queues the prefetch address in a prefetch address buffer, and issues the prefetch addresses to memory when memory is available.

A mode 58a identifies the type of loading to accomplish. For example, mode 58a may be set to "preload" to indicate that all data in the prefetch region beyond a given reference address and up to the prefetch block are to be preloaded from main memory into the cache during a first memory reference of a multimedia function. This mode provides more efficient memory access than preloading individual prefetch blocks, but incurs the overhead of communicating more data than might be needed. Thus, a programmer or compiler may chose whether or not to use the prefetch mode, based on the programmer's knowledge of the program's desired functions.

As indicated above, the information shown in FIG. 2 is stored in hardware registers and can be modified by special instructions. The special instructions to configure the hardware registers also represent hints included in the rest of the programmed instructions. Typically, the compiler or programmer will set these registers before entering a tight loop of a function to be processed. It is contemplated that the compiler could use profiling to identify memory regions that are likely to benefit from prefetching.

Figure 3:
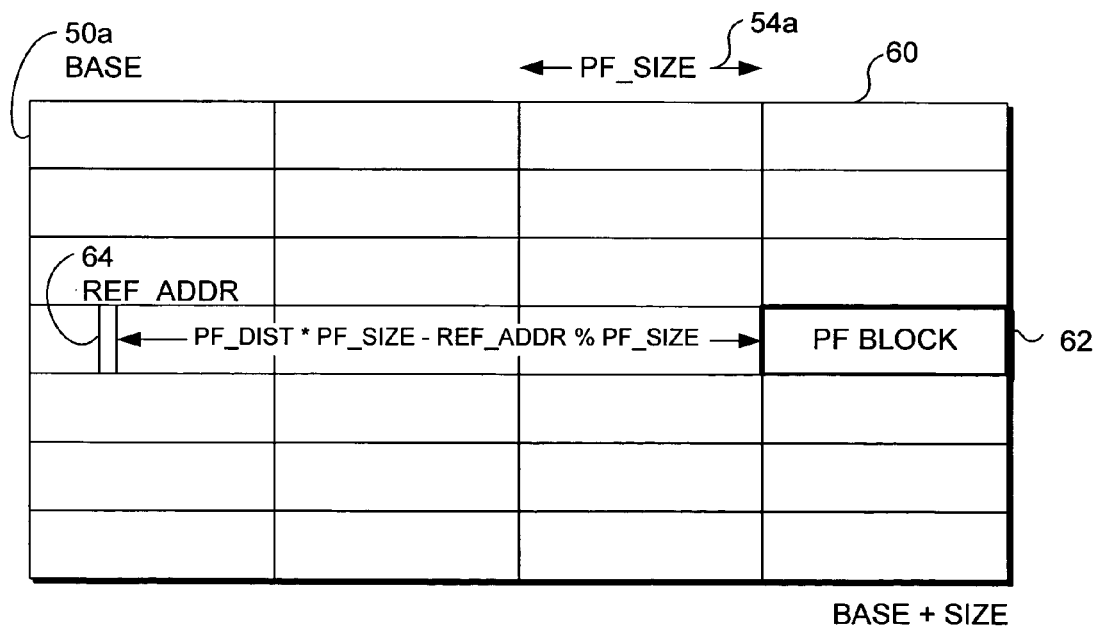
FIG. 3 illustrates a one-dimensional prefetch region in main memory from which data are loaded into cache.

FIG. 3 illustrates a prefetch region 60 in main memory from which data are loaded into cache. As indicated above, the hardware registers of FIG. 2 identify the characteristics of prefetch region 60 in FIG. 3, and are used to initiate prefetches from prefetch region 60. Those skilled in the art will recognize that the base address is only logically aligned with a logical edge of memory, not physically aligned with any physical aspect of memory. When a reference address of a load instruction (REF_ADDR) 64 falls within prefetch region 60, a prefetch block 62 is computed. The size of prefetch block 62 is defined by the prefetch size, such as PF_SIZE 54a, which is preferably a power of two. The distance from the reference address of the load instruction to prefetch block 62 is approximately equal to a product of the prefetch distance and the prefetch size (e.g., PF_DIST 56a*PF_SIZE 54a). The exact address of the prefetch block is a sum of the reference address and approximate distance to the load instruction, less the modulus of the reference address and the prefetch size (i.e., REF_ADDR 64+ (PF_DIST 56a*PF_SIZE 54a)−(REF_ADDR 64% PF_SIZE 54a)). The modulus operation is used to align the prefetch block to a grid with each cell equal to the size of the prefetch size (i.e., PF_SIZE 54a). A prefetch block is loaded from main memory if and only if the prefetch block is contained within the prefetch region, and the prefetch block does not already exist in the prefetch buffer, write buffer, or the data cache.

Figure 4A:
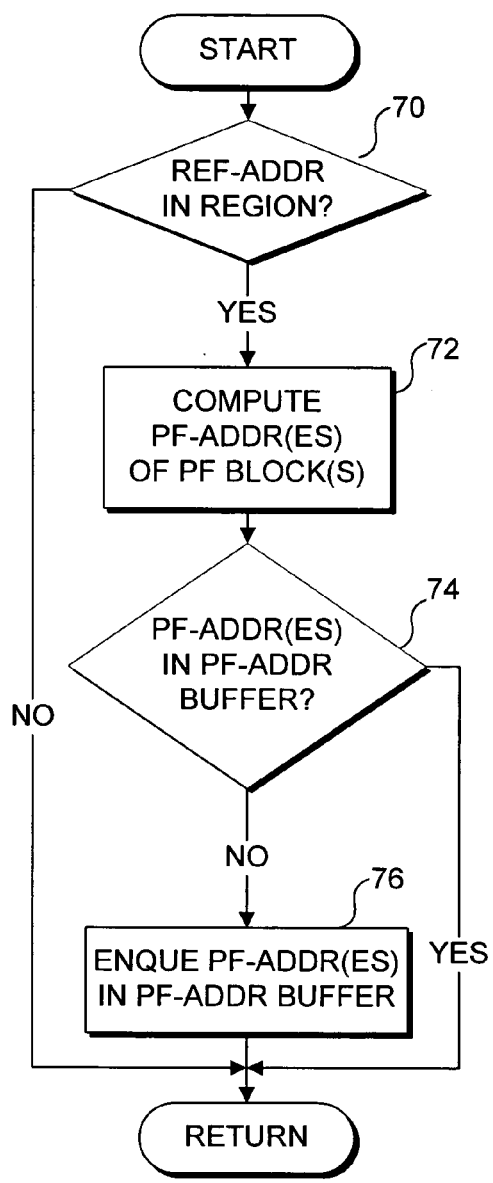
FIG. 4A is a flow diagram illustrating logic utilized by the prefetch controller in computing one or more prefetch addresses.
Figure 4B:
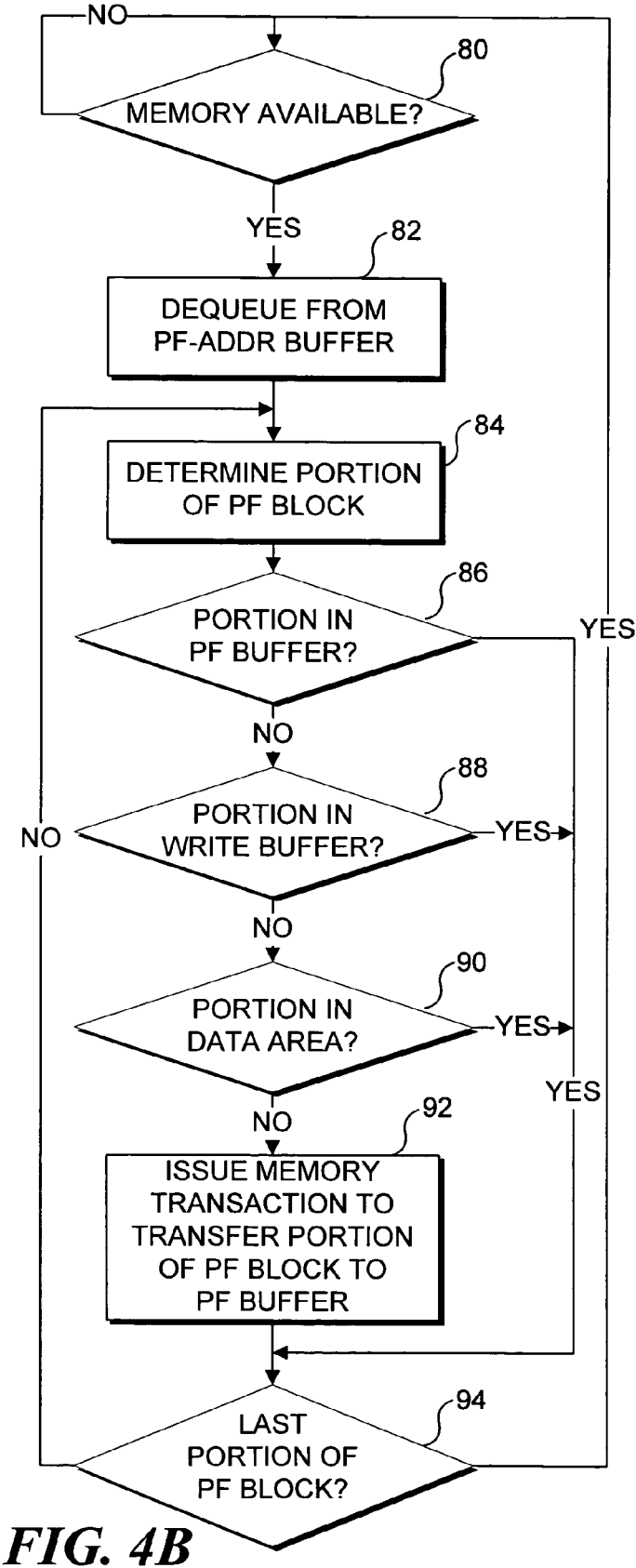
FIG. 4B is a flow diagram of logic utilized by the cache to prefetch the prefetch block of data from main memory.

FIGS. 4A and 4B are flow diagrams illustrating logic for prefetching data from the main memory as needed. Specifically, FIG. 4A is a flow diagram illustrating logic utilized by the prefetch controller in computing one or more prefetch addresses. At a decision step 70, the prefetch controller evaluates the base address (e.g., base address 50a) and the size (e.g., size 52a) of each prefetch region against the reference address of a load and/or store instruction, to determine whether the reference address falls within a prefetch region. If the reference address does not fall within a prefetch region, no prefetch address need be generated. However, if the reference address does fall within a prefetch region, the prefetch controller computes the address of the prefetch block at a step 72, as described above.

At a decision step 74, the prefetch controller determines whether the prefetch address is already stored in the prefetch address buffer. If the prefetch address is already in the prefetch address buffer, control returns to decision step 70 to process another reference address. However, if the prefetch address is not in the prefetch address buffer, the prefetch controller queues the prefetch address into the prefetch address buffer, at a step 76. Preferably, the prefetch controller also queues the size of the prefetch block into the prefetch address buffer for faster access to the prefetch address and size pair.

FIG. 4B is a flow diagram of logic utilized by the cache to prefetch the prefetch block of data from main memory. Those skilled in the art will recognize that the prefetch controller could alternatively perform the logic below if the prefetch controller is provided with a communication path to the main memory. Similarly, the prefetch controller and cache can share the prefetching process in other combinations. For illustrative purposes, we discuss FIG. 4B in terms of actions taken by the cache. At a decision step 80, the cache controller determines whether the main memory is available for accessing. If the main memory is not available, the cache controller periodically rechecks the main memory until it is available. Then at a step 82, the cache controller obtains a prefetch address and size pair from the prefetch address buffer.

Rather than immediately accessing main memory at the prefetch address for the prefetch block of data, it is preferable to first check cache storage areas to determine whether the desired data was previously obtained. However, the entire prefetch block of data may not have been previously obtained. In that case, a portion of the data of the desired prefetch block may be in cache and another portion may need to be obtained from main memory. To address this issue, the cache storage areas are checked for each cache line of the desired prefetch block. For example, if a cache line is 32 bytes, the cache controller checks the cache storage areas for each 32 bytes of the desired prefetch block.

Thus, at a step 84, the cache controller determines an address of one cache line portion of the prefetch block based on the prefetch address and size pair obtained from the prefetch address buffer. At a decision step 86, the cache controller determines whether the one cache line portion is already stored in the prefetch buffer. If the one cache line portion is already stored in the prefetch buffer, the cache controller need not check any further. In that case, control passes to a decision step 94 to determine whether the one cache line portion was the last portion of the desired prefetch block, thereby indicating that the entire prefetch block has been processed. However, if the one cache line portion is not already available in the prefetch buffer, the cache controller determines, at a decision step 88, whether the one cache line portion is already stored in the write buffer. If the one cache line portion is already stored in the write buffer, the cache controller need not check any further, and control passes to decision step 94. Similarly, if the one cache line portion is not already available in the write buffer, the cache controller determines, at a decision step 90, whether the one cache line portion is already stored in the data area of the cache. If the one cache line portion is already stored in the data area of the cache, the cache controller need not check any further, and control passes to decision step 94.

However, if the one cache line portion is not already available in any storage area of the cache, the cache controller issues a memory transaction, at a step 92, to transfer the one cache line portion of the prefetch block from main memory to the prefetch buffer. At decision step 94, the cache controller then determines whether all portions of the desired prefetch block have been cached by determine whether the last portion of the prefetch block has been processed. If the entire prefetch block is now stored in some portion(s) of the cache, control returns to decision step 80 to process a different prefetch address. However, if the entire prefetch block has not yet been checked or obtained, control returns to step 84 to process the next portion of the prefetch block.

Load and store instructions are processed in relatively few cycles, and generate a whole prefetch block at a time. Whereas checking the cache storage areas at this later stage, only involves an individual cache line portion, and it is processed at the slower rate of the memory. Therefore, it is preferable to check the cache for individual cache line portions at this later stage. For example, load and/or store instructions could happen every cycle. In contrast, a 32-byte transaction to memory typically takes at least four cycles. Thus, it is more manageable to lookup one cache line portion in the prefetch buffer, write buffer, and data area in four cycles related to a memory transaction, than it is to lookup a whole prefetch block in a single cycle related to a load and/or store instruction.

Simulation Results

Three separate on-chip memory models were simulated to evaluate the embodiment described above. The first on-chip memory model is based on the prior art and is referred to as a DMA model. The DMA model simulates an advanced DMA controller that transfers data between the RAMBUS main memory and a 32-Kbyte on-chip scratchpad memory. This 32-Kbyte on-chip scratchpad memory can sustain a bandwidth of 256 bits per cycle. Functions that use this on-chip memory model can use double buffering in the on-chip memory.

The second on-chip memory model is also based on the prior art, and is referred to as a data cache only model. The data cache only model implements the 8-Kbyte, 4-way set-associative data cache described above without the PDP controller and without the prefetch buffer. However, the data cache only model does include the write buffer. Peak transfer rates from the main memory to the cache memory, and from the cache memory to the functional units, are identical to the DMA model with the DMA controller.

The third on-chip memory model represents the embodiment of the invention described above, including the PDP controller and prefetch buffer. For simulation purposes, two sub-models were tested. Sub-models 3*a* and 3*b* correspond to two different prefetch buffer sizes. Sub-model 3*a* has a prefetch buffer size of 16 Kbytes, so it is referred to as a PDP-16K model. Sub-model 3*b* has a prefetch buffer size of 32 Kbytes and is referred to as a PDP-32K model. The larger buffer size of the PDP-32K model is useful for certain media functions that have high spatial locality, such as a transpose function. For such functions, the PDP-32K model was used to illustrate how a slightly different prefetching hardware and scheme affects performance characteristics.

TABLE 1 summarizes the simulation parameters of the three models. Note that the instruction cache is found in all three models, whereas the data cache is found only in the latter two memory models and prefetching is supported only in the third memory model.

TABLE 1

SIMULATION PARAMETERS OF THREE MODELS

|  | Model 1 (DMA) | Model 2 (Data Cache Only) | Model 3 (PDP with PF Buffer) | |
| --- | --- | --- | --- | --- |
| Instruction Cache |  | Size: 32 Kbytes Line size: 32 bytes Associativity: 4-way | | |
| Scratchpad Memory | Size: 32 Kbytes 64-cycle minimum delay to main memory | None | None | |
| Data Cache | None | Size: 8 Kbytes Line size: 32 bytes Associativity: 4-way Write Policy: writeback with 4-Kbyte write buffer Write buffer writeback levels: hi = 96, lo = 0 Write miss policy: write allocate for scalar stores No write allocate for vector stores Replacement policy: least recently used 64-cycle minimum cache miss delay | | |
| Prefetch Buffer | None | None | Sub-Model 3a (PDP-16K) Size: 16 Kbytes Line size 32 bytes Prefetch address | Sub-Model 3b (PDP-32K) Size: 32 Kbytes |

TABLE 1-continued

SIMULATION PARAMETERS OF THREE MODELS

| Model 1 (DMA) | Model 2 (Data Cache Only) | Model 3 (PDP with PF Buffer) |
|---|---|---|
| | | buffer size: 10 addresses total Prefetch regions: 4 3-cycle hit delay |

Simulations were conducted to evaluate three main performance characteristics; overall execution time, memory bandwidth, and memory latency. For each characteristic, the PDP models (PDP-16K and PDP-32K) were compared with the two prior art memory models. Four functions were simulated with each memory model; frame average, binary dilate (using a 5×5 kernel), two-dimensional convolution (using a 3×3 kernel), and transpose. For each function, TABLE 2 lists the compile-time information stored in the hardware registers of the PDP models.

in a tight loop. Thus, only small blocks of data are reused at a time, so increasing the data cache size does not improve execution time.

In contrast, the program-directed prefetching model at least maintains the execution time at a level comparable to that of the DMA-based model, but eliminates the detailed programming required for the DMA approach. Note that the first three functions were not performed for the PDP-32K model, but would produce the same results obtained for the PDP-16K model.

TABLE 2

COMPILE-TIME INFORMATION

| | Frame Average | | Binary Dilate | Two-Dimensional Convolution | Image Transpose | |
|---|---|---|---|---|---|---|
| | | | | | (PDP-16K) | (PDP-32K) |
| | Region 1 | Region 2 | Region 1 | Region 1 | Region 1 | Region 1 |
| BASE | Base address of source image 1 | Base address of source image 2 | Base address of source image | Base address of source image | Base address of source image | Base address of source image |
| SIZE | Size of source image 1 | Size of source image 2 | Size of source image | Size of source image | Size of source image | Size of source image |
| PF_SIZE | 4096 bytes | 4096 bytes | 4096 bytes | 4096 bytes | 16384 bytes | 4096 bytes |
| PF_DIST | 1 block | 1 block | 1 block | 1 block | 0 blocks | 4 blocks |
| MODE | w/preload | w/preload | w/preload | w/preload | w/preload | w/preload |

The specified preload mode means that the first reference to a prefetch region issues a prefetch for all data from the reference address through the end of the prefetch block, rather than prefetching only the individual prefetch block. Prefetching all the data at once reduces any penalty due to cold misses, where a cold miss is the first cache miss to a particular memory address.

TABLE 3 lists the total execution time in cycles for all four functions using each model. In comparison to the DMA model (model 1), the performance of model 2 is generally very poor, due to the low memory bandwidth and inability to hide the memory latency. Increasing the data cache size to 32 Kbytes for model 2 resulted in little change in the execution times. No improvement in the execution time occurred for reasons related to data reuse. Functions such as the frame average and image transpose functions use each piece of data only once. Thus, the processor cannot utilize the data multiple times from cache. Therefore, increasing the data cache size does not improve execution time. Other functions, such as the two-dimensional convolution function, only process small blocks of the frame data at a time

TABLE 3

EXECUTION TIME (IN CYCLES)

| | Model 1 (DMA) | Model 2 (Data Cache Only) | Model 3 (PDP with PF Buffer) | |
|---|---|---|---|---|
| | | | (PDP-16K) | (PDP-32K) |
| Feame Average | 114k | 1050k | 112k | n.a. |
| Binary Dilate | 115k | 201k | 113k | n.a. |
| 2D Convolution | 166k | 699k | 184k | n.a. |
| Image Transpose | 104k | 568k | 122k | 78k |

TABLE 4 shows the effect of DRAM page accesses in the data transfer. It is possible to estimate a peak bandwidth of DRAM memory based on a clock rate and data width. However, the measured memory bandwidth is lower than the peak bandwidth. The measured memory bandwidth also depends on the ordering of addresses and timing of requests. Generally, ordering the addresses to be consecutive, so that multiple requests can hit the same page at a time, will achieve a higher bandwidth. The timing of requests can affect the bandwidth as well because some DRAM controllers (such as the one used in this simulation) will automatically close a DRAM page after some idle time has elapsed.

TABLE 4

MEMORY BANDWIDTH (MBYTES/SECOND)

|  | Model 1 | Model 2 (Data | Model 3 (PDP with PF Buffer) | |
|---|---|---|---|---|
|  | (DMA) | Cache Only) | (PDP-16K) | (PDP-32K) |
| Frame Average | 2980 | 1340 | 3070 | n.a. |
| Binary Dilate | 2720 | 1410 | 2750 | n.a. |
| 2D Convolution | 2980 | 1540 | 3040 | n.a. |
| Image Transpose | 2620 | 1540 | 2980 | 3070 |

The active bandwidth shown in TABLE 4 is the average data transfer rate (i.e., the total amount of data transferred divided by the execution time) obtained during active use of RAMBUS memory (for simulation purposes, the RAMBUS memory was considered to be actively used when its command queue contained outstanding read or write requests). The average data transfer rate by itself was not used, because it is not a good indicator of how efficiently the memory bandwidth is utilized. In particular, a high cache-hit ratio or a computation-bound function can lead to long idle periods in the memory system. These idle periods reduce the average data transfer rate, but idle periods are not necessarily an indicator of poor memory utilization. Memory idle periods in simulations varied from between 7 percent and 91 percent, as shown in TABLE 5.

TABLE 5

MEMORY IDLE TIME (PERCENT OF EXECUTION TIME)

|  | Model 1 | Model 2 (Data | Model 3 (PDP with PF Buffer) | |
|---|---|---|---|---|
|  | (DMA) | Cache Only) | (PDP-16K) | (PDP-32K) |
| Frame Average | 7 | 78 | 8 | n.a. |
| Binary Dilate | 91 | 88 | 89 | n.a. |
| 2D Convolution | 57 | 80 | 61 | n.a. |
| Image Transpose | 23 | 76 | 42 | 12 |

As can be seen from TABLE 4, the DMA-based model and the program-directed prefetch model achieve an active bandwidth very nearly the same, but almost twice that of the data cache only model. The reason for the similarity between the results for the DMA model and the PDP model is that they both transfer relatively large blocks of data containing sequences of consecutive addresses. Because the data cache only model is a blocking cache, it will incur a page miss for each memory access (i.e., the DRAM page will be automatically closed when the DRAM page is idle).

The largest difference in bandwidth between the DMA-based model and the program-directed prefetch model exists in the transpose function. The active bandwidth of the PDP-32K model is 17% higher than that of the DMA-based model. This difference occurs because the DMA program for transpose was programmed to transfer 32×32-byte sub-blocks from 512×512-byte input data, resulting in accesses across four DRAM pages for a single sub-block (each DRAM page has a size of 4 Kbytes). The PDP-32K model instead buffers 512×8-byte blocks (i.e., a whole DRAM page) in the prefetch buffer, achieving a better active bandwidth. Those skilled in the art will recognize that with the necessary on-chip memory space, the above improvement could also be achieved by a DMA program as well if modified appropriately from the original version used in the simulation. Similarly, the PDP-32K model achieves a higher active bandwidth than the PDP-16K model, because the PDP-32K model has a larger prefetch buffer than the PDP-16K model, which is unable to store as many DRAM pages at a time in the smaller 16 Kbyte prefetch buffer.

TABLE 6 lists memory latencies for a memory store instruction, measured in stall cycles per memory store instruction. This simulation is not applicable to the DMA model. To measure memory latency for the cache-based models, the total number of stall cycles due to memory instructions were divided by the total number of memory references. The numbers were separated between load and store instructions.

TABLE 6

STORE LATENCY (STALL CYCLES PER STORE INSTRUCTION)

|  | Model 1 | Model 2 (Data | Model 3 (PDP with PF Buffer) | |
|---|---|---|---|---|
|  | (DMA) | Cache Only) | (PDP-16K) | (PDP-32K) |
| Frame Average | n.a. | 2.06 | 2.09 | n.a. |
| Binary Dilate | n.a. | 2.67 | 2.90 | n.a. |
| 2D Convolution | n.a. | 2.08 | 2.05 | n.a. |
| Image Transpose | n.a. | 2.01 | 2.03 | 2.47 |

There was little difference in store latency between the data cache only model (model 2) and the program-directed prefetch model (model 3). Sometimes the program-directed prefetch model incurred a slightly higher store latency, which can happen when the write buffer fills while a long prefetch is in progress. The memory instruction that causes the write buffer to be filled has to stall the main processor until the prefetch completes. Most store instructions incur cache misses because store instructions are almost always used exclusively for storing the result of the computation to a new destination location (intermediate results are usually kept in registers). The latency is relatively low even for cache misses, because 256-bit register stores do not need to allocate cache lines.

TABLE 7 lists memory latencies for a memory load instruction, also measured in stall cycles per memory load instruction.

TABLE 7

LOAD LATENCY (STALL CYCLES PER LOAD INSTRUCTION)

|  | Model 1 | Model 2 (Data | Model 3 (PDP with PF Buffer) | |
|---|---|---|---|---|
|  | (DMA) | Cache Only) | (PDP-16K) | (PDP-32K) |
| Frame Average | n.a. | 60.70 | 3.22 | n.a. |
| Binary Dilate | n.a. | 2.91 | 0.116 | n.a. |
| 2D Convolution | n.a. | 12.70 | 0.432 | n.a. |
| Image Transpose | n.a. | 63.10 | 8.58 | 2.35 |

Two different types of functions can be recognized here. Frame average and image transpose functions have nearly zero cache hits. For the data cache only model (model 2), load instructions typically have a latency equal to the memory latency, which is roughly 60 cycles, because a blocking data cache is used. With the program-directed prefetch model (model 3), load instructions incur a prefetch hit that has a minimum latency of two cycles. The prefetch hit latency can be larger than two cycles when there is a late prefetch (a memory access to the cache line that is being prefetched) or when cache replacements fill the write buffer. Late prefetches happen frequently when a computation on the fetched data is simple, as is the case in frame average and image transpose functions.

The other type of functions, including binary dilate, and two-dimensional convolution, reuse data. This reuse explains why the average memory read latency is so much lower than with frame average and image transposition functions. Nevertheless, the ratio of instruction latency cycles between the data cache only model and the program-directed prefetch model remains roughly the same (about 25:1 to 30:1).

Prefetching in Two Dimensions

The compile-time parameters discussed above, which are stored in the hardware registers of the PDP controller, provide a data structure for prefetching in one dimension. One-dimensional prefetching corresponds to accessing data in a contiguous sequence of memory locations. For example, data representing an image is typically stored in a contiguous sequence of memory locations, even though the image is displayed as a two-dimensional set of pixels. Although the image includes multiple rows of pixels, the image data is stored in one long sequence of memory locations. Thus, one-dimensional prefetching corresponds to accessing the contiguous image data in series.

As a result, if one wishes to access data for a specific portion of an image, such as a specific row of pixels, one must access all data up to, and including, the data for the desired row of pixels. Conceptually, this one-dimensional access method wraps around the end of one row of pixels to the next row of pixels. Such an access method is referred to as row-major order.

Figure 5:
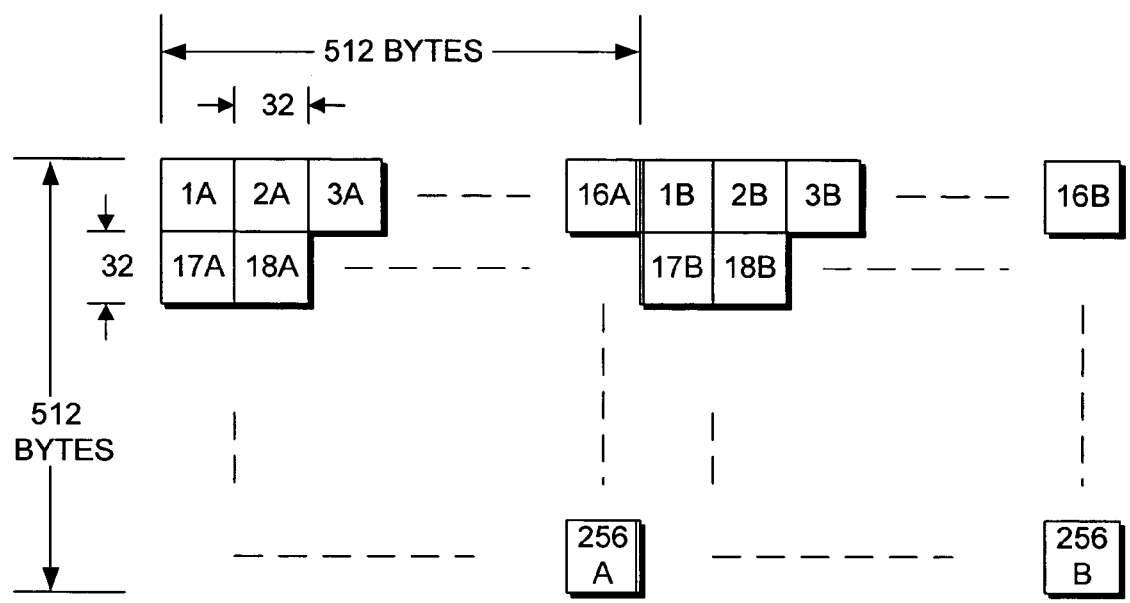
FIG. 5 illustrates how data are accessed in row-major order for two sets of image blocks during an image transpose function.

For example, FIG. 5 illustrates how data are accessed in row-major order during an image transpose function. For illustrative purposes, the entire image is broken into a number of blocks of pixels. Each block corresponds to 32×32-bytes corresponding to 8×8 pixels (i.e., 32 bytes by 32 bytes for a total of 1024 bytes per block of 64 pixels). Also for illustrative purposes, half of the blocks comprise a set A (i.e., 1A–256A), and the other half of blocks comprise a set B (i.e., 1B–256B). To perform the image transpose function on the entire image, an entire row of blocks would be processed before another row could be processed. Specifically, blocks 1A through 16B would be processed before blocks 17A through 32B. Correspondingly, data for an entire row would be needed before data for another row would be accessed.

However, if one wishes to transpose only one portion of the image, only a portion of the data in memory may need to be prefetched at a time. For example, if the blocks comprising set A were to be transposed, none of the blocks of set B would be needed. However, using one-dimensional row-major order to access the data of set A would require accessing data associated with all blocks to the end of a row of blocks, including data for set B.

To avoid prefetching unnecessary data, portions of the image can be identified and the dimensions of that portion can be used to directly access data associated with the desired portion of the image. The extent of an entire image is referred to as its pitch. For example, the pitch across both sets A and B is 1024 bytes. The extent of a desired portion of an image is referred to as its width. For example, set A has a width of 512 bytes.

One way to access portions of data is through the prior art DMA model. The prior art DMA model discussed above enables a programmer to transfer individual blocks of data from within a desired memory region (e.g., within a single DRAM page) without tying up the CPU, because the DMA model can transfer individual blocks requested by the image function being performed. However, the DMA model requires the programmer to identify the detailed memory locations to be transferred. Also, unless all the desired data falls within a single DRAM page, multiple DRAM pages must be accessed, which introduces inefficiencies. For example, the prior art DMA model can transfer data for a single block of set A in FIG. 5 to use in transposing that image block. However, an entire block does not fall within a single DRAM page. Assuming a DRAM page size of 4,096 bytes, each DMA access of a DRAM page would access data for four horizontal pixel rows of image blocks 1A through 16B (i.e., 4,096 bytes divided by 1,024 bytes per pixel row of 32 total image blocks across sets A and B, equals 4 pixel rows). Because the image transpose function requests an entire block, yet an entire block is not contained in a single DRAM page, the transfer of only a portion of a block from an accessed DRAM page results in a page miss. To access the remaining 28 rows to complete a single block, seven more DRAM pages would have to be accessed, each comprising four horizontal memory rows. Therefore, to access one complete 32×32-byte block, a total of eight DRAM pages must be accessed, resulting in eight page misses.

Rather than having the DMA controller predetermine the portions of a DRAM page to transfer to cache, the one-dimensional PDP embodiments discussed above prefetch a whole DRAM page at a time, place the prefetched data into the prefetch buffer, and then allow the cache controller to obtain the portion needed. With a large prefetch buffer, all the DRAM pages required to cover an entire image block could be prefetched to the prefetch buffer. However, the prefetch buffer would have to be large enough to hold data that is currently being accessed by the cache controller for processing, and the next set of prefetched data.

The one-dimensional PDP-32K model described above could be used to prefetch data for two rows of 16 image blocks of one set of image blocks, if the pitch and width were both equal to 512 bytes (i.e., if the entire image comprised only set A blocks stored in memory). Specifically, assuming a prefetch size of 4,096 bytes set equal to the DRAM page size of 4,096 bytes, the 32 Kbyte prefetch buffer of the PDP-32K model could hold data for 32 whole image blocks (i.e., 1024 bytes per block times 32 blocks equals 32 Kbytes). A 32 Kbyte prefetch buffer would enable the processor to reference the data for entire blocks 1A through 16A, while blocks 17A through 32A are prefetched. Thus, for a small image and/or large enough prefetch buffer, the one-dimensional PDP-32K model provides higher performance for the transpose function than the DMA model and the PDP-16K model (as is shown in TABLE 3).

However, when the horizontal dimension of the image is large (such as when the image pitch is different than the width for both sets A and B), or when the prefetch buffer size is small (such as 16 Kbytes), the one-dimensional PDP-32K model may not be applicable. For example, if the transpose function is to be performed on set A image blocks of FIG. 5 and data for both sets A and B are stored in memory, data from a current prefetch would replace data already in the prefetch buffer before the data in the prefetch buffer are referenced by the processor. This premature replacement would occur because there is insufficient space in the prefetch buffer to hold all the excess prefetched data of set B image blocks. In this example, when the processor starts referencing the data of block 1A (that were previously prefetched to the prefetch buffer), the PDP controller will instruct the cache controller to start prefetching data for block 17A. However, because the data of block 1A is the oldest data in the prefetch buffer and the prefetch buffer is full of data from blocks 1A through 16B, the cache controller will start to replace the data of block 1A with the data of block 17A. This replacement will occur just when the processor needs the data from block 1A.

In these circumstances, it is preferable to avoid all the excess data beyond the desired width, and instead skip the excess data by prefetching with vertical capability, thereby prefetching the data in the flow direction of only the desired transpose data (shown in FIG. 5), as is done by the DMA model. To support prefetching in two dimensions, a second preferred embodiment is provided. Specifically, a second data structure of compile-time information is stored in an expanded set of hardware registers, and a more sophisticated computation is performed to obtain a desired prefetch block.

Figure 6:
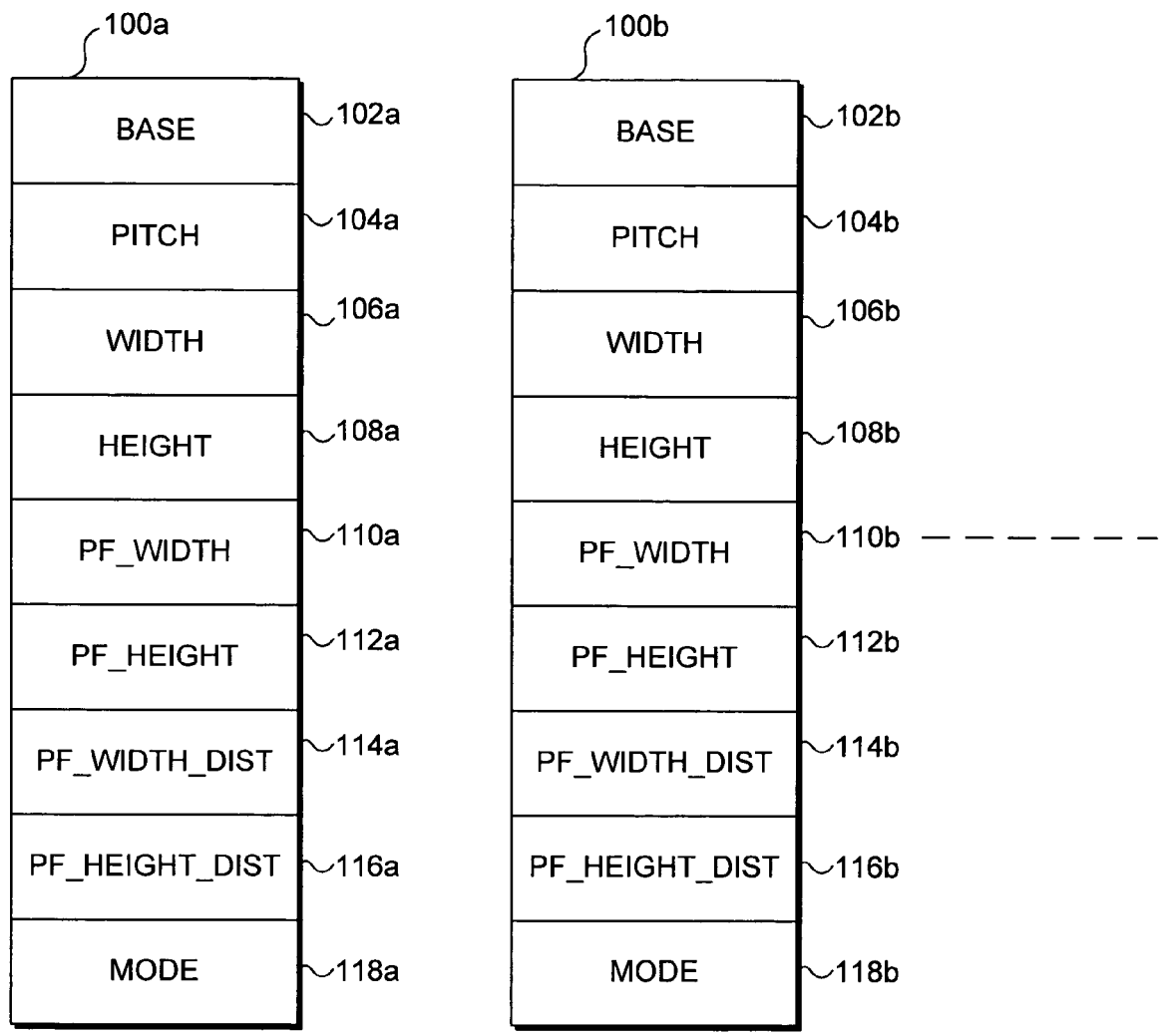
FIG. 6 illustrates a second data structure of compile-time information stored in hardware registers of the PDP controller used for two-dimensional prefetching.

FIG. 6 illustrates a second data structure of compile-time information stored in hardware registers of the PDP controller used for prefetching. As with the one-dimensional embodiment above, multiple sets of region registers 100a, 100b, etc. specify prefetch regions in memory containing data to be prefetched. Also like the one-dimensional embodiments discussed above, a set of region registers 100a includes a base address 102a, which is the starting address within main memory of a two-dimensional prefetch region. However, region registers 100 a provide more detailed information to define an embedded two-dimensional prefetch region rather than a continuous one-dimensional prefetch region size.

For example, region registers 100a include a pitch 104a, a width 106a, and a height 108a. As described above with respect to FIG. 5, pitch 104a of FIG. 6 may correspond to a total horizontal length of an image, which can be represented by a number of blocks in a virtual row of memory. Similarly, width 106a may correspond to a horizontal length of only a desired portion of the total image, and can also be represented by a number of blocks in a virtual row of memory. The width is less than, or equal to, the pitch. Height 108a may correspond to the second dimensional size of the desired portion of the image, and may be represented by a number of vertical blocks or number of virtual rows in memory. By providing separate fields for the pitch, width, and height, a two-dimensional prefetch region can be defined. Defining a two-dimensional prefetch region makes it possible, for example, to restrict prefetching to a vertical strip of an image, rather than having to wrap around unneeded data.

A prefetch width (PF_WIDTH) 110a is similar to the prefetch size (PF_SIZE) of the one-dimensional embodiment, and depends on the image function being performed. For example, to perform the image transpose function described with respect to FIG. 5, the prefetch width would preferably be set to 32 bytes, corresponding to the width of a single block. Similarly, a prefetch height (PF_HEIGHT) 112a in FIG. 6 is set to a number of rows in the block which defines a vertical dimension of a prefetch block. For example, to perform the image transpose function described with respect to FIG. 5, the prefetch height would also preferably be set to 32 rows, corresponding to the height of a single block. Thus, the data for a whole image block could be prefetched directly without prefetching excess unneeded data.

To identify the prefetch block in the two-dimensional prefetch region that is to be obtained, it is helpful to describe the offsetting method in two stages, although a single computation can be performed. First, a grid base is identified, which corresponds to the address of the first byte of a block that the reference address falls within. Second, from the grid base, a prefetch width distance (PF_WIDTH_DIST) 114a and a prefetch height distance (PF_HEIGHT_DIST) 116a are used as offset coordinates. Prefetch width distance 114a indicates a number of blocks of a width PF_WIDTH in a horizontal direction to a desired prefetch block from the grid base. Similarly, prefetch height distance 116a indicates a number of blocks of a height PF_HEIGHT in a vertical direction to a desired prefetch block from the grid base. As with the one-dimensional prefetcher, if the desired block falls outside the prefetch region, the desired block will not be prefetched, and must be obtained through normal memory access methods.

As with the one-dimensional embodiments, a mode 118a identifies the type of loading to accomplish. Similar to the one-dimensional embodiments, mode 118a may be set to "preload" to indicate that all data in the prefetch region beyond a given reference address and up to the prefetch block are to be preloaded from main memory into the cache. Here, however, the data is prefetched in two dimensions, so that only data within the prefetch region width is prefetched.

Figure 7:
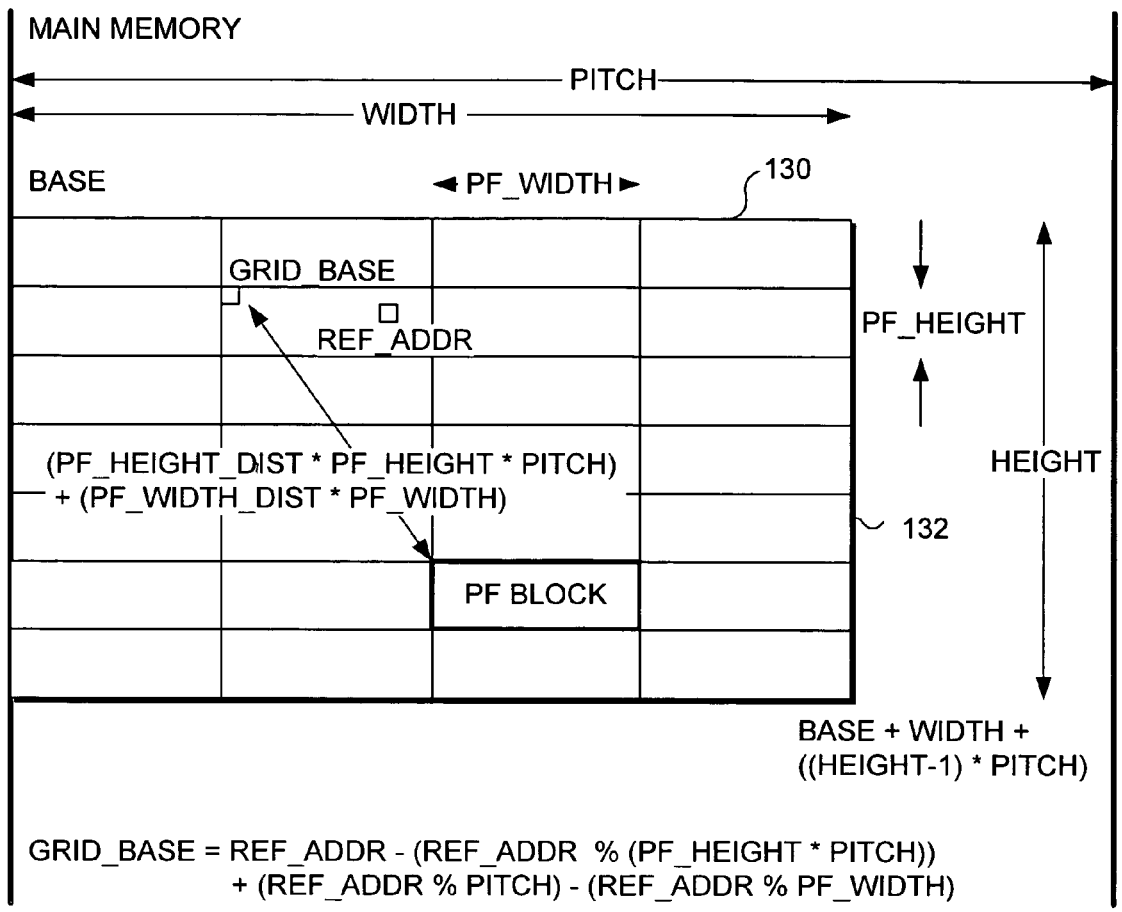
FIG. 7 illustrates a two-dimensional prefetch region in main memory from which data are loaded into cache.

To further explain two-dimensional prefetching, FIG. 7 illustrates a two-dimensional prefetch region 130 in main memory from which data are loaded into the cache. As indicated above, the hardware registers of FIG. 6 identify the characteristics of prefetch region 130 in FIG. 7 and are used to initiate prefetches from prefetch region 130. Also, as above, those skilled in the art will recognize that the base address is only logically aligned with a logical edge of memory, not aligned with any physical edge of the memory. Thus, the prefetch region may fall anywhere within the memory space.

A location of a desired prefetch block 132 is computed from the parameters in the hardware registers. Although the calculation may be performed directly, it is broken into two steps for illustrative purposes. When a reference address of a load instruction (REF_ADDR) falls within prefetch region 130, a grid base (GRID_BASE) is first determined. As indicated above, the grid base corresponds to the first byte of a block that the reference address falls within. The grid base is computed with the following expression:

REF_ADDR−(REF_ADDR %
(PF_HEIGHT*PITCH))+(REF_ADDR %
PITCH)−(REF_ADDR % PF_WIDTH).

The grid base can be computed in hardware by a sequence of additions and bit shifting if the pitch, prefetch width (PF_WIDTH), and prefetch height (PF_HEIGHT) are powers of two.

The distance from the grid base to prefetch block 132 is computed with the following expression:

(PF_HEIGHT_DIST*PF_HEIGHT*PITCH)+
(PF_WIDTH_DIST*PF_WIDTH)

Note that if the dimensions of the cells of the grid shown in FIG. 7 are powers of two, the multiplications reduce to shift operations. Also, the two-dimensional prefetching technique described above can be used for one-dimensional prefetching by setting the prefetch height (PF_HEIGHT) to one (1) and the prefetch height distance (PF_HEIGHT_DIST) to zero (0), while using a prefetch region with a height of one (1) and a pitch equal to the width. The two-dimensional calculations above are performed at step 72 of FIG. 4, in an analogous fashion to the one-dimensional calculations at this step.

Although the present invention has been described in connection with the preferred form of practicing it, those of ordinary skill in the art will understand that many modifications can be made thereto within the scope of the claims that follow. For example, as indicated above, those skilled in the art will recognize that the invention could be extended to prefetch data from a three-dimensional prefetch region, or any other multi-dimensional prefetch region, provided the compile-time information identifies the bounds of the prefetch region. Further, the invention may prefetch data that are stored at an address occurring before the reference address, or in another order rather than simply being disposed after the reference address. Prior or random prefetching may be beneficial for data that are not stored in a bounded prefetch region. Even for data that are stored in a bounded prefetch region, it may be valuable to prefetch data stored before the reference address, such as for repeated prefetching of data in a processing loop. If it is known that a looping process will continue to repeatedly access the same data, or updated data, which are too large to all be maintained in the cache, it may be beneficial to prefetch the data that are stored before the reference address, rather than wait until the loop starts again at the beginning of the prefetch region. Alternatively, it may be beneficial to prefetch data that are stored before the reference address, rather than requiring a determination that the offset from the reference address must wrap around to the beginning of the prefetch region. Those skilled in the art will also recognize that the prefetch buffer may be a separate unit from the cache, and a separate controller may transfer data between main memory and the prefetch buffer. Accordingly, it is not intended that the scope of the present invention in any way be limited by the above description, but instead be determined entirely by reference to the claims that follow.

The invention claimed is:

1. A method for prefetching data stored in a memory, comprising the steps of:
(a) providing a reference address associated with a machine instruction that is executable to carry out a function other than prefetching the data;
(b) determining that the reference address indicates a location within a prefetch region of the memory, said prefetch region being defined by compile-time information associated with a set of machine instructions for processing the data, wherein said compile-time information is stored in at least one hardware register;
(c) determining an address of a prefetch block of the data within the prefetch region as a function of the reference address and the compile-time information; and
(d) prefetching the prefetch block of the data from the prefetch region of the memory before the prefetch block of the data is required for processing in accord with the set of machine instructions.

2. The method of claim 1, wherein the step of determining that the reference address indicates a location within the prefetch region comprises one of the steps of:
(a) determining that the reference address indicates a location within a one-dimensional prefetch region of the memory; and
(b) determining that the reference address indicates a location within a multi-dimensional prefetch region of the memory.

3. The method of claim 2, wherein the step of determining that the reference address indicates a location within the one-dimensional prefetch region comprises the steps of:
(a) accessing a base address included in the compile-time information, said base address identifying a beginning of a continuous segment of memory comprising the one-dimensional prefetch region;
(b) accessing a size included in the compile-time information, said size identifying an extent of the continuous segment of memory comprising the one-dimensional prefetch region; and
(c) determining that the reference address lies between the base address and a final address defined by a sum of the base address and the size.

4. The method of claim 2, wherein the step of determining that the reference address indicates a location within the multi-dimensional prefetch region of the memory comprises the steps of:
(a) accessing a base address and a size of the memory in at least one dimension that are included in the compile-time information, said base address identifying a beginning of an embedded portion of the memory comprising the multi-dimensional prefetch region;
(b) accessing an embedded size of each dimension of the multi-dimensional prefetch region included in the compile-time information, said embedded size of each dimension identifying an extent of the embedded portion of memory in the dimension of the multi-dimensional prefetch region; and
(c) determining that the reference address lies within the embedded portion of memory as a function of the base address and a final address corresponding to each embedded size of each dimension of the multi-dimensional prefetch region.

5. The method of claim 1, wherein the step of determining the address of the prefetch block comprises one of the steps of:
(a) determining the address of the prefetch block within a one-dimensional prefetch region of the memory; and
(b) determining the address of the prefetch block within a multi-dimensional prefetch region of the memory.

6. The method of claim 3, wherein the step of determining the address of the prefetch block comprises the steps of:
(a) accessing a prefetch size included in the compile-time information, said prefetch size identifying a size of the prefetch block;
(b) accessing a prefetch distance included in the compile-time information, said prefetch distance identifying an offset from the reference address to a location within the prefetch block; and
(c) determining a staffing address of the prefetch block as a function of the reference address, the prefetch size, and the prefetch distance.

7. The method of claim 4, wherein the multi-dimensional prefetch region is a two-dimensional prefetch region; and wherein the step of determining the address of the prefetch block comprises the steps of:
(a) accessing a pitch included in the compile-time information, said pitch identifying the size of the memory in at least one dimension;
(b) accessing a prefetch width included in the compile-time information, said prefetch width identifying a horizontal size of the prefetch block;
(c) accessing a prefetch height included in the compile-time information, said prefetch height identifying a vertical size of the prefetch block;

(d) accessing a width distance included in the compile-time information, said width distance identifying a horizontal distance to a location within the prefetch block, said horizontal distance being measured from a grid base that is determined as a function of the reference address;

(e) accessing a height distance included in the compile-time information, said height distance identifying a vertical distance to a location within the prefetch block, said horizontal distance being measured from the grid base address; and (f) determining a starting address of the prefetch block as a function of the reference address, the pitch, the prefetch width, the prefetch height, the width distance, and the height distance.

8. The method of claim 1, wherein the step of prefetching the prefetch block of the data comprises the step of conveying the prefetch block of the data to a cache.

9. The method of claim 8, wherein the step of conveying the prefetch block of the data to a cache comprises the step of loading the prefetch block of the data into a prefetch buffer within the cache.

10. The method of claim 9, further comprising the step of conveying the prefetch block of the data from the prefetch buffer to a data area of the cache for use by a processor.

11. The method of claim 1, further comprising the step of determining that the prefetch block of the data is not already stored in a prefetch buffer of a cache used to temporarily store the data for use by a processor, prior to the step of prefetching the prefetch block of the data.

12. The method of claim 1, further comprising the step of determining that the prefetch block of the data is not already stored in a write buffer of a cache used to temporarily store the data for use by a processor, prior to the step of prefetching the prefetch block of the data.

13. The method of claim 1, further comprising the step of determining that the prefetch block of the data is not already stored in a data area of a cache used to temporarily store the data for use by a processor, prior to the step of prefetching the prefetch block of the data.

14. A system for program-directed prefetching of data for use by a media processor, comprising:

(a) a memory that stores data accessible by the media processor, said memory including a cache in which portions of the data are temporarily stored and are more rapidly accessed by the media processor for processing than the data stored in other portions of the memory; and (b) a program-directed prefetch (PDP) controller in communication with the cache, said PDP controller providing the cache with compile-time information that defines a prefetch region of the memory and indicates prefetch data to be prefetched from the prefetch region of the memory in response to a program instruction that is included to cause the media processor to carry out a function other than prefetching data.

15. The system of claim 14, wherein the PDP controller comprises a set of registers that stores the compile-time information defining the prefetch region of the memory.

16. The system of claim 14, wherein the PDP controller provides compile-time information for one of:

(a) one-dimensional prefetching, wherein the one-dimensional prefetching accesses prefetch data from a continuous segment of the memory comprising the prefetch region; and (b) multi-dimensional prefetching, wherein the multi-dimensional prefetching accesses prefetch data from an embedded segment of the memory comprising a multi-dimensional prefetch region.

17. The system of claim 16, wherein the compile-time information for the one-dimensional prefetching comprises:

(a) a base address of a one-dimensional prefetch region in the memory;

(b) a size defining a continuous extent of the one-dimensional prefetch region in the memory;

(c) a prefetch size indicating a block size of data to be prefetched;

(d) a distance to a location of a desired block of data to be prefetched, said distance being measured from a machine instruction reference address lying within the prefetch region; and (e) a mode indicating a mode of a prefetching operation.

18. The system of claim 16, wherein the compile-time information for multi-dimensional prefetching comprises:

(a) a base address of the multi-dimensional prefetch region in the memory and a size of the memory in at least one dimension;

(b) a size for each dimension of the multi-dimensional prefetch region;

(c) a size for each dimension of a block of data to be prefetched;

(d) a distance in each dimension to a location of the block of data to be prefetched, each distance being measured from a grid base address that is a function of a reference address for the program instruction lying within the multi-dimensional prefetch region; and (e) a mode indicating a mode of prefetching operation.

19. The system of claim 14, wherein the cache comprises:

(a) a cache controller in communication with the PDP controller, said cache controller utilizing the compile-time information to prefetch data from the prefetch region of the memory; and (b) a prefetch buffer for storing data prefetched from the prefetch region of the memory.

20. The system of claim 19, said cache further comprising a data area in communication with the cache controller and the prefetch buffer, said cache controller causing prefetched data stored in the prefetch buffer to be conveyed to the data area for use by the media processor.

21. The system of claim 20, wherein the data area comprises the prefetch buffer.

22. The system of claim 14, wherein the PDP controller is in communication with the media processor and receives a reference address from the media processor, said reference address identifying a location in the prefetch region of the memory from which the prefetch data are offset.

23. A media processor for prefetching media data stored in a memory to avoid programming a direct memory access function to access the media data, comprising:

(a) a function unit that executes machine instructions;

(b) a cache in communication with the function unit, said cache temporarily storing portions of the media data for use by the function unit in executing the machine instructions; and (c) a program-directed prefetch (PDP) controller in communication with the function unit and the cache, said PDP controller storing compile-time information that defines a prefetch region of the memory and defines an offset to a prefetch block of the media data in the memory, said prefetch block of the media data being prefetched from a location in the memory determined as a function of the offset and as a function of a reference address indicated by a machine instruction that is executed by the function unit for a purpose other than prefetching data.

24. The media processor of claim 23, wherein the PDP controller comprises a set of registers in which the compile-time information is stored.

25. The media processor of claim 23, wherein said prefetch block of the media data is prefetched by one of:
   (a) one-dimensional prefetching, wherein one-dimensional prefetching accesses prefetch data from a continuous segment of the memory comprising the prefetch region; and
   (b) multi-dimensional prefetching, wherein multi-dimensional prefetching accesses prefetch data from an embedded segment of the memory comprising the prefetch region.

26. The media processor of claim 25, wherein the compile-time information for one-dimensional prefetching comprises:
   (a) a base address of the continuous segment of the memory comprising the prefetch region;
   (b) a size defining an extent of the continuous segment of the memory comprising the prefetch region;
   (c) a prefetch size indicating a block size of data to be prefetched from the continuous segment of the memory comprising the prefetch region;
   (d) a prefetch distance indicating a distance to a location of a desired block of data to be prefetched, said distance being measured from the reference address within the prefetch region indicated by the machine instruction; and
   (e) a mode indicating a mode of prefetching operation.

27. The media processor of claim 25, wherein the multi-dimensional prefetch region is a two-dimensional prefetch region; and wherein the compile-time information for two-dimensional prefetching comprises:
   (a) a base address of the embedded segment of the memory comprising the prefetch region;
   (b) a pitch indicating an extent of continuous media data stored in the memory corresponding to a horizontal dimension of an image;
   (c) a width indicating an extent of the media data stored in the memory and corresponding to a partial length of the horizontal dimension of the image, said width further indicating a horizontal dimension of the embedded segment of the memory comprising the prefetch region;
   (d) a height indicating an extent of continuous media data stored in the memory corresponding to a vertical dimension of the image;
   (e) a prefetch width indicating a horizontal size of a block of data to be prefetched;
   (f) a prefetch height indicating a vertical size of the block of data to be prefetched;
   (g) a prefetch width distance indicating a horizontal distance to a location of the block of data to be prefetched, said horizontal distance being measured from a grid base address that is a function of said reference address within the embedded segment;
   (h) a prefetch height distance indicating a vertical distance to the location of the block of data to be prefetched, said vertical distance measured from the grid base address that is a function of said reference address within the embedded segment; and
   (i) a mode indicating a mode of prefetching operation.

28. The media processor of claim 23, wherein the cache comprises:
   (a) a cache controller in communication with the PDP controller and the function unit, said cache controller utilizing the compile-time information to prefetch media data from the prefetch region of the memory; and
   (b) a prefetch buffer for storing media data prefetched from the prefetch region of the memory.

29. The media processor of claim 28, further comprising a data area in communication with the cache controller and prefetch buffer, said cache controller causing prefetched media data stored in the prefetch buffer to be communicated to the data area for use by the media processor.

30. The media processor of claim 29, wherein the data area comprises the prefetch buffer.

31. A computer-readable medium having machine instructions for prefetching data stored in a memory, so that when the machine instructions are executed by a computing device that can access the memory, a plurality of functions are carried out, including:
   (a) determining that a reference address associated with a machine instruction executable to carry out a function other than prefetching data indicates a location within a prefetch region of the memory, said prefetch region being defined by compile-time information associated with a set of machine instructions for processing the data, wherein said compile-time information is stored in at least one hardware register;
   (b) determining an address of a prefetch block of the data within the prefetch region as a function of the reference address and the compile-time information; and
   (c) prefetching the prefetch block of the data from the prefetch region of the memory before the prefetch block of the data is required for processing in accord with the set of machine instructions.

* * * * *